United States Patent [19]
Grigoriev

[11] Patent Number: 5,429,379
[45] Date of Patent: Jul. 4, 1995

[54] IMPULSE DRIVE MECHANISM AND SHOCK DRIVER FOR A LAND VEHICLE

[76] Inventor: Nikita Grigoriev, E. James St., Richfield Springs, N.Y. 13439

[21] Appl. No.: 206,978

[22] Filed: Mar. 7, 1994

[51] Int. Cl.[6] .......................... B62M 1/16; B62M 1/08
[52] U.S. Cl. ........................ 280/233; 74/128; 74/138; 280/212; 280/230; 280/234; 280/276
[58] Field of Search ............... 280/233, 234, 276, 212, 280/215; 267/226, 34; 74/128, 138

[56] References Cited

U.S. PATENT DOCUMENTS

| | | | |
|---|---|---|---|
| 534,537 | 2/1895 | Williams | 280/234 |
| 559,934 | 5/1896 | Cunningham . | |
| 567,042 | 9/1896 | Raymond . | |
| 567,629 | 9/1896 | Young . | |
| 682,953 | 9/1901 | Norton . | |
| 3,701,543 | 10/1972 | Clark et al. . | |
| 4,416,464 | 11/1983 | Mattox . | |
| 4,971,344 | 11/1990 | Turner | 280/276 |
| 5,035,678 | 7/1991 | Hageman . | |
| 5,088,705 | 2/1992 | Tsai | 280/276 |
| 5,188,003 | 2/1993 | Trammell, Jr. . | |
| 5,282,640 | 2/1994 | Lindsey | 280/234 |
| 5,308,097 | 5/1994 | Bono et al. | 280/234 |

FOREIGN PATENT DOCUMENTS

| | | | |
|---|---|---|---|
| 2558555 | 1/1984 | France . | |
| 3126075 | 10/1982 | Germany . | |
| 4132794 | 4/1993 | Germany . | |
| 282046 | 1/1934 | Italy | 280/233 |
| 17835 | of 1894 | United Kingdom | 280/234 |

Primary Examiner—Mitchell J. Hill
Attorney, Agent, or Firm—Schmeiser, Olsen & Watts

[57] ABSTRACT

A land vehicle or bicycle (110) is disclosed having a front wheel drive which includes an impulse drive mechanism and shock driver. The front wheel drive mechanism (140) includes a handle bar/driver mechanism (151) attached to an impulse drive mechanism (166). The bicycle (110) may be used such that the handle bar/driver mechanism (151) is fixed for use as a conventional bicycle or may be released by a twist grip (159) or thumb release (193) so that the bicycle may be driven by a drive mechanism (140). The shock drive mechanism (FIGS. 14–16) provides forward propulsion force due to the compression (308) and recoil (304) forces of a shock absorber (144) when the bicycle (110) encounters a bump, curb or other obstacle.

12 Claims, 11 Drawing Sheets

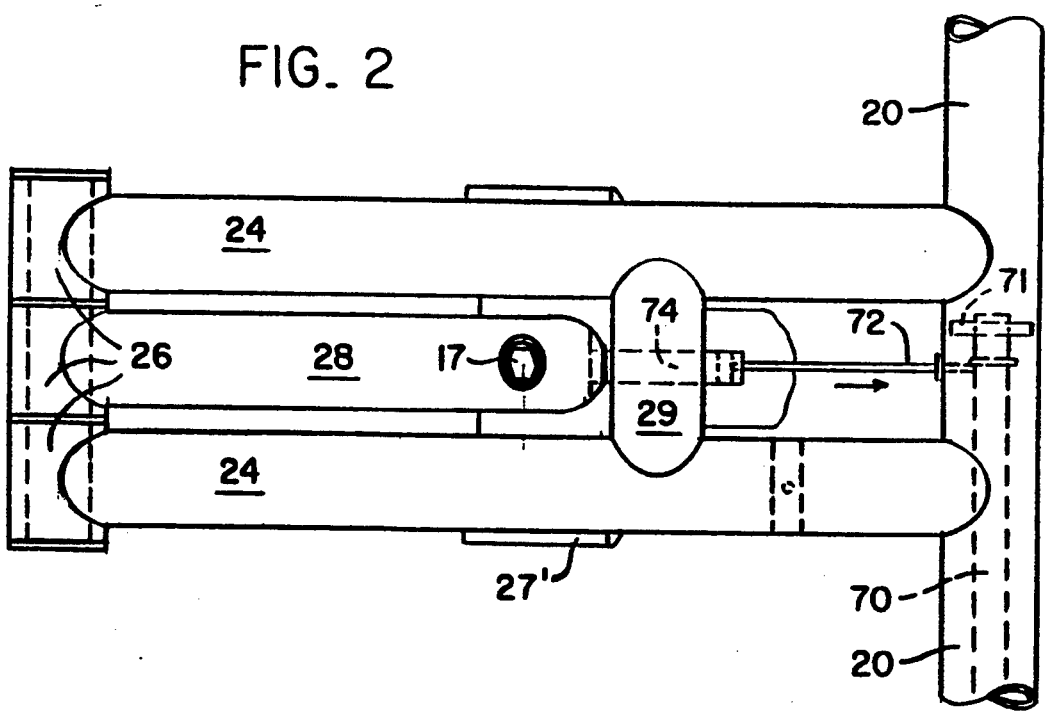
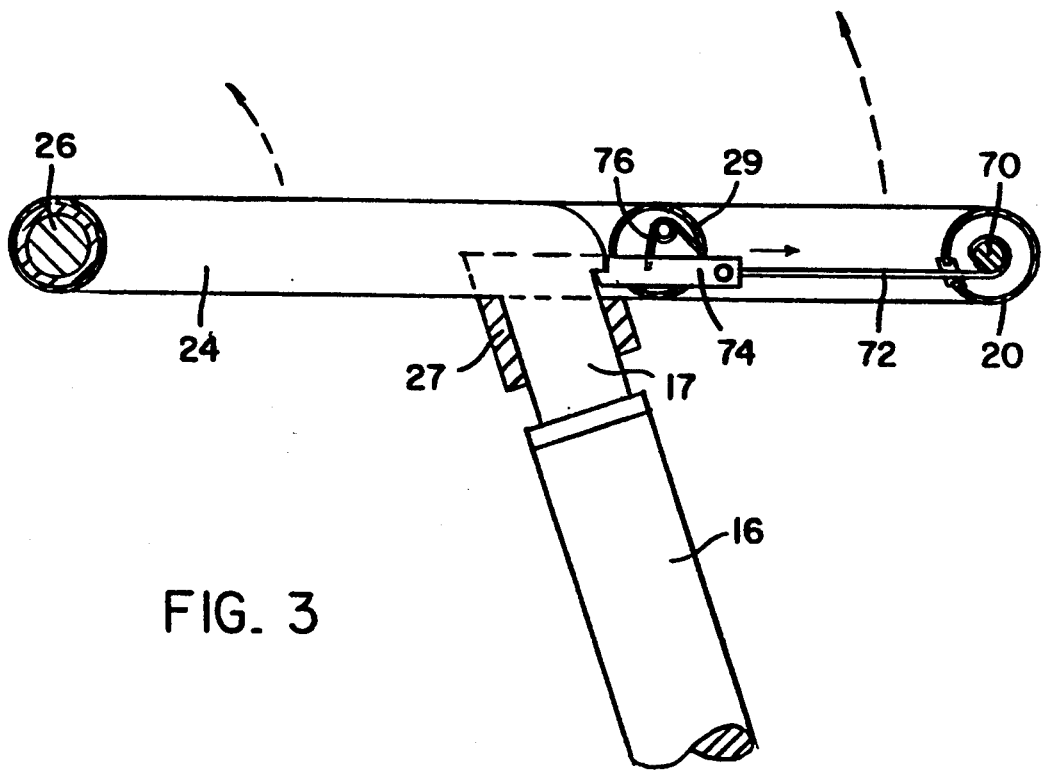

IMPULSE DRIVE MECHANISM AND SHOCK DRIVER FOR A LAND VEHICLE

BACKGROUND OF THE INVENTION

1. Field of the Invention

This invention relates generally to drive apparatus for propulsion of land vehicles. More specifically, the present invention is directed to a mechanical system that delivers impulse and/or shock energy for propulsion of a land vehicle in the direction of travel.

2. Discussion of Relevant Art

The prior art teaches methods and apparatus for constructing and acquiring front or steering wheel drive for land vehicles, principally bicycles and tricycles. A common thread in such disclosures is the use of pedaling or manual (rotating) energy for intermittent or continuous driving force that is, via mechanical apparatus, transferred to the front wheel. It is this front wheel or steering wheel that is generally used to determine course or direction of the vehicle.

In U.S. Pat. No. 5,158,214, issued to Pinos et al. in 1992, a traction system for a bicycle is disclosed in which a flexible chain system is used to link power, delivered to the rear drive sprocket of a bicycle, with a separate drive means attached to the front wheel (steering wheel) of the bicycle. Conventional sprockets are used in the Pinos et al. disclosure and one differing aspect is (are) the multiplicity of traction chains used for effecting the flexible transmission. A similar dual wheel driven bicycle concept is taught by Becoat in U.S. Pat. No. 5,184,838, issued in 1993. Becoat, however, extracts power from the rear sprocket and transfers it to the front wheel (steering wheel) of the bicycle via an elongate, flexible shaft or cable. Both of the aforesaid teachings appear to achieve the same ends by slightly different means. However, neither are capable of delivering an impromptu stroke or impulse of driving energy (torque) solely to the steering or front wheel of the bicycle. Further, because the steering wheel of both bicycles can never accelerate faster than the rear (drive) wheel, both the Pinos and the Becoat bicycles allow their operators no distinctive advantage when executing a turn.

The above patents fall into, what I define as, the pedal or pedaling drive category of driven steering wheels. Another category is that wherein the steering wheel of the vehicle is manually powered, generally by the hands and upper torso of the body. One of the earliest of such devices was disclosed by Schaibly in U.S. Pat. No. 613,943 issued in 1898. The Schaibly device was a conventional bicycle which employed a hand-driven crank connected to a front wheel driving sprocket so that the hands of the rider could, by a rocking motion, propel the front wheel of the bicycle. A distinct disadvantage of the Schaibly apparatus was that front wheel propulsion could not be effected while the operator of the bicycle was pedaling, thus transferring power only to the rear wheels. At such time, the intricate rocking drive mechanism for the front wheel served exclusively as a steering assembly for the bicycle. A later version of the Schaibly art is disclosed in U.S. Pat. No. 3,823,959, issued in 1974 to Winters. Winters employed a hand "pedaling" apparatus that was an adjunct to the primary steering assembly (a set of traditional, although slightly elevated handle bars). In the Winters teaching, a hand propelled crank is rigidly bolted to the vertical steering stem of the bicycle and a chain is used to take off power therefrom and deliver it down-stem to a conventional driving sprocket which serves as the hub of the front, steering wheel. The remaining portion of the Winters disclosure, like the Schaibly before it, is simply incapable of providing the performance needed for delivering a rapidly or impulsively generated power stroke to the steering wheel.

U.S. Pat. No. 4,417,742, issued in 1983 to Intengan discloses the combined the cable transmission idea of Becoat with the hand motivated front wheel drive of Winters, having avoided the necessity of a handle bar set by integrating the hand crank with a steering arm assembly, so that the steering wheel (front wheel) turned in response to an azimuthal change in the steering arm assembly.

Use of a multiple-drive vehicle such as a bicycle, tricycle and three-or four-wheeled, all-terrain vehicle in a competitive or off-road environment, many times requires an acutely executed turn. During such turns, a steering wheel which has independent rotational movement from the other wheel is necessary. If the steering wheel is rigidly affixed to the other wheel by gear drive mechanisms, then the drive mechanism will break or require excessive slippage.

SUMMARY OF THE INVENTION

The present invention includes an impulse drive mechanism and shock driver for a wheel of a land vehicle such as a bicycle, tricycle, wheel chair, automobile, truck, motorcycle, or any other manually propelled or motorized vehicle. By doing such, the present invention overcomes the disadvantages of the earlier-mentioned relevant art and contrived, not only a mechanism for acquiring heretofore unavailable steering capability, but a unique form of recreation device. In particular this disclosure is directed toward a standard bicycle, of either the racing or dirt bike type. Before presenting a disclosure of my invention the following definitions are provided.

By definition, the term:

"Cable" means a cord, rod, rope, line, chain, wire, tendon, twisted strand or other similar elongate member.

"Clutch" means a rotational energy transfer device such as a ratchet, annular dog assembly, inertial clutch, friction plate, hub, sprocket (gearing), spindle, roller clutch (manufactured by INA Bearing Company of Fort Mill, S.C.) or the like which engages an adjacent rotational energy receiving device.

"Impact or Shock Energy" means energy delivered to a shock absorber when a Traction Device encounters an obstacle, such as a rock or curb.

"Impulse Energy" means a surge of force applied to a drive member during a power stroke followed by a recoil or reset of said drive member (e.g., the force applied to a pull cord on a lawn mower).

"Impulse Drive Mechanism" means a device adapted for transferring Impulse Energy or Impact Energy into rotary propulsive energy. Such device preferably includes a reset spring attached to a Clutch, such as a ratchet or roller clutch.

"Recoil" means a retrograde or reflexing reinitialization process that returns a system automatically to a rest, dwell, norm or home (initial) posture.

"Shock Driver Mechanism" means a device that converts Impact Energy into motive energy to propel the Traction Device of a vehicle in a direction of travel.

"Steering Assembly" means the apparatus or device used to manually steer a vehicle.

"Steering Wheel" means a wheel of a land vehicle, whether or not driven, which can affect, by its positioning, the direction in which the vehicle is moving.

"Torque converter" means any hollow or solid cylindrical (or circular) capstan used for effecting or acquiring angular moment. A cable is wound about at least the first embodiment in the instant invention.

"Traction Device" means a ground contacting member, such as a tire, wheel, track, or the like on a vehicle for propelling the vehicle in a direction of travel.

"Undriven (article or device)" means an article or device which is normally devoid of motivational force, e.g., it is likely to be an idler wheel, steering wheel, etc.

I have developed, in a common bicycle, a method and device for rapidly applying a power stroke, of an impulse nature, to the front (or steering) wheel of the bicycle. In doing so, I provide the biker with better traction and more control during an acute turn and, concomitantly, greater acceleration capability while powering the bicycle. Both of these characteristics (control and acceleration) derive from the fact that, by using my invention, one may derive a naturally maximum transfer of exertion (force), in generating the power stroke, for application to the front wheel because, while flexing the upper torso to develop the power stroke, one of the feet will always be on the power stroke of the pedaled crank apparatus, and thus tend to maximize the (torso) upwardly acting and (foot) downwardly acting force factors of the body. Other advantages in my invention will be discerned by the reader throughout the disclosure, such as on-demand usage, minimum disturbance to steering because of my unique second class lever arrangement (a castellated handle bar assembly is shown in the first embodiment and a single stem handle bar assembly is shown in the second embodiment) and an elegance in design which makes it a rugged, inexpensive and unobtrusive system for acquiring the primary power stroke to be delivered to the steering wheel.

Relative to the bicycle, the invention includes a compound second class lever and steering assembly. This is mechanized by forming a second class lever system using a castellated handle bar assembly, with a lever arm, in which the applied force is placed on the forwardly disposed handle grips, is fulcrumed at rearwardly disposed (turret) extremes, and then hinged at the extremes of the lever extensions to an essentially straight bar which is rigidly fixed to the steering stem of the bicycle, orthogonal to the steering wheel, in a conventional handle bar-stem-wheel yoke fashion. I then use a non-extensible cable, which is attached between the aforesaid handle bars and hinged (fulcrum) portions and run thence downwardly through a guy to a torque conversion device. The torque converter is of either a recoil or dwell type, compounded with a clutch mechanism, or positioned immediately adjacent to such a clutch mechanism, and the clutch biased so that after engagement, it will disengage and return to a home, neutral or initial position. As in the definition above, I refer generically to this retrograde or reflexing (to an initial position) as "recoil". In my preferred embodiment, the torque converter, clutch and recoil or biasing mechanism are mechanically included in an apparatus that is popularly identified with the lawn mower manually operated, recoil starter. The recoil starter employs a ratcheted engaging mechanism, enclosed in a capstan, which is used to engage and direct angular force directly to the engine spindle or shaft (here, the bicycle hub or steering wheel axle), driving it off "home" and which at the end of the power stroke (that is delivered by the operator pulling on the starting cord), disengages for prompt return (recoil) to the "home" position. But this mechanism, one well known in the art, may be mechanized in a number of ways that are quite apparent, by now, to those of ordinary skill. My novel contribution to the art is the use of the second class lever-steering assembly which is used to literally "pull the cord". When the biker is ready to deliver the power stroke of the invention (any time that he desires or, ideally, as he/she is beginning a pedal power stroke to the rear wheels), he/she has but to unlock the handle bar assembly and execute a rowing maneuver while continuing to guide the bicycle in the desired direction. Since the (rowing) up-stroke on the handle bar assembly is in a direction opposite the foot pedal, downward (power) stroke, maximum body muscle efficiency is obtained. Force applied on the aforesaid cable rises quite rapidly to a maximum point and, because of attaining the maximum travel in the rowing stroke, decays immediately, thus emulating an impulse function. The cable may be, as in the preferred embodiment, wound about the capstan of a recoil type torque converter device or, as in an alternate embodiment, concatenated to a chain of the bicycle type (double pivot link) and drawn thence about the gear of a conventional bicycle drive sprocket, the noncable-connected end being tethered to a portion of the yoke or stem by an elastomeric cord or spring, in order to form the earlier mentioned biasing means for initializing either the torque converter, or the chain, after the steering and lever assembly is returned to its nominal, start or rest position. Thus, successive pulls on the cable, by the biker emulating a rowing exercise, will generate a series of torque inputs to the front (steering) wheel causing it to pull the bicycle forward or, if performed while executing a turn, accelerate the wheel into the turn by virtue of the added momentum transferred thereto. It is quite possible for the biker to continue in a straight path, however, and avail himself/herself of the therapeutic exercise benefits of a bicycle equipped with my invention.

From the hereinafter detailed description of the invention, the methodology and mechanism disclosed herein will provide the reader the following advantages:

First, increased traction: Normal drive wheels, being virtually unaffected by the addition of the instant front wheel drive device, continues to be the primary motivation of the vehicle. This type of steering wheel drive will not only increase overall traction, but greatly increase control on slippery, steep or rough terrain. The shock drive mechanism will convert shock energy into forward momentum.

Second increased power: There is a noticeable increase in overall power output the biker can produce and transmit to the bicycle, particularly the steering wheel. This is crucial during maximum performance situations and can be a critical maneuvering factor during an abrupt turn. For example, with the steering wheel carrying more momentum, the bars or yoke (fork) can be "wrenched" left or right and an otherwise unachievable "professional racing" turn executed.

Third increased physical workout: The biker normally pulls up against the handle bars, especially when standing on the pedals during high effort pedaling. The ability to move the handle bars with force gives the arms, shoulders and back muscles (upper torso) a much more aggressive workout than can be obtained on any of the earlier hand or arm cranked bicycles.

A second embodiment of the present invention includes further advantages to an impulse-type front wheel drive. In particular, the handle bars can be used for impulse driving or may be locked out for use as a conventional bicycle. A release mechanism is provided for disengaging the impulse handle bars from a conventional position to transfer power to the impulse drive mechanism.

Another feature of the second embodiment is an adjustable torque bar. The longitudinal axis of the torque bar may be adjusted to provide a longer torque arm or shorter torque arm thus varying the mechanical advantage of the impulse drive or front wheel drive.

A different feature of the second embodiment of the present invention is a dual fork drive for providing symmetrical movement about a centerline of the adjustable lever/torque arm.

A further feature is the shock driver mechanism. As the shock compresses by hitting a bump or other obstacle, the energy due to the compression and recoil of the shock is transferred back into the wheel of the vehicle, thus minimizing energy loss.

BRIEF DESCRIPTION OF THE DRAWINGS

FIG. 2 is a top view (central) handle bar and lever assembly;

FIG. 3 is a side elevation, taken partially in section, the handle bar steering and lever assembly;

FIG. 10 is a plan view of another embodiment of the release mechanism of the second embodiment of the present invention.

FIG. 11 is a cutaway elevational view of another embodiment of the release mechanism of the second embodiment of the present invention.

DETAILED DESCRIPTION OF THE PREFERRED EMBODIMENT

Figure 1:
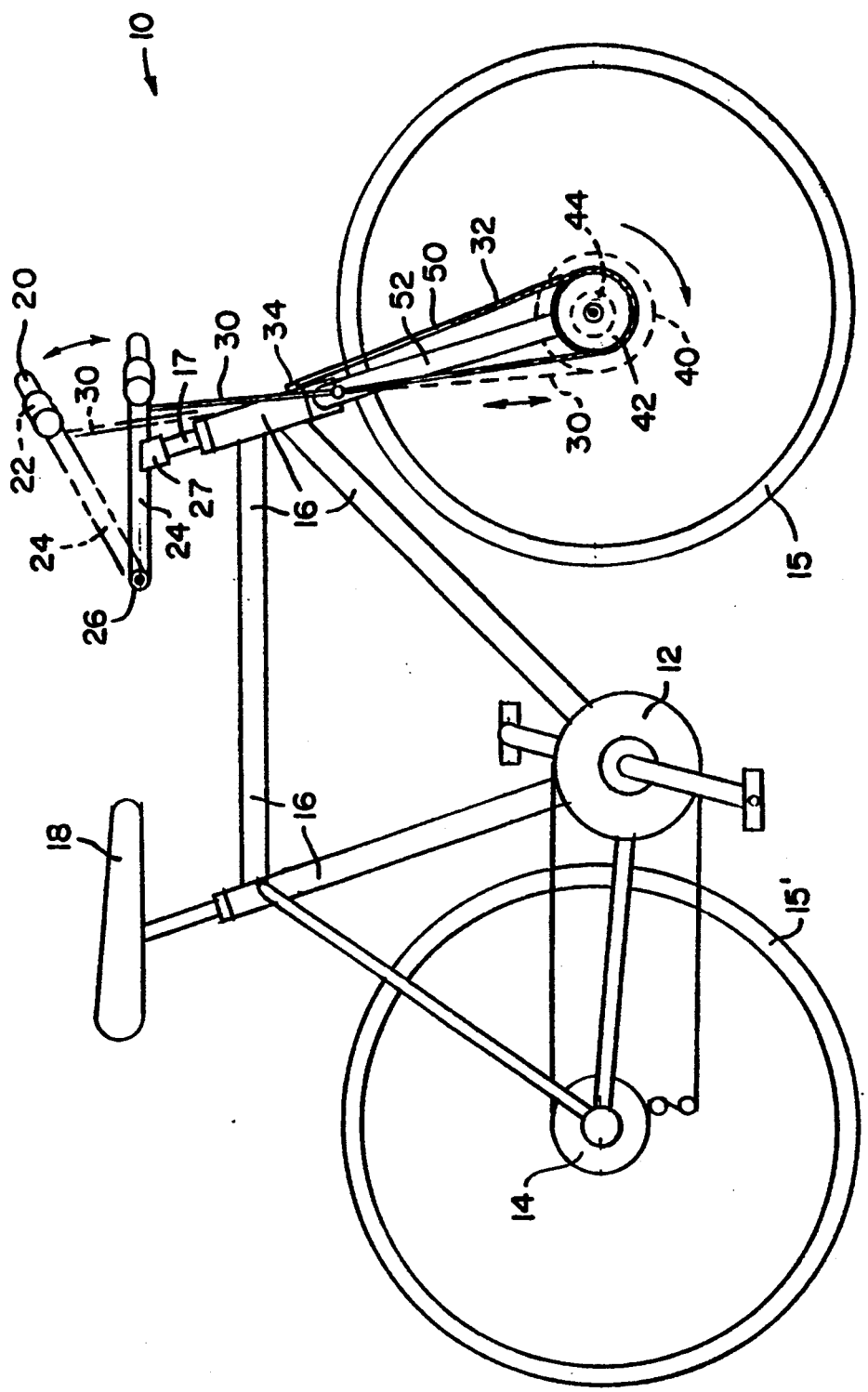
FIG. 1 is a side elevation of a bicycle equipped with the first embodiment of the present invention.

Referring generally to FIG. 1, there is illustrated a first embodiment of the present invention 10 affixed to a conventional bicycle. For the purposes of definition, the salient portions of the bicycle consist in the foot pedal crank assembly 12, the rear drive sprocket 14, the front steering wheel 15 and rear (driven) wheel 15', the principal components of the bicycle frame 16, rider seat 18, a handle bar assembly 20, front steering stem 17 and front wheel yoke or fork 52. The nexus of the present invention, a compound steering-and-rowing lever assembly, includes the handle bar assembly 20 joined to two parallel lever arms 24 which form a castellated shape incorporating turrets that extend rearwardly and are concentrically hinged 26 to a stationary and essentially straight steering arm 28 that is rigidly mounted to the steering assembly stem 17. The rowing lever assembly is movable between a locked horizontal position and a raised (dashed) actuated position by the biker's (not shown) rowing action which is applied to handle grips 22. When the handle bar assembly is returned to the rest (and locked) position, as shown in the horizontal illustration thereof, it rests on lever seat 27'. Connected to the lever arm 24 is a cable 30 which is directed downward and, in the illustration of FIG. 1, concatenated to a chain 32. The chain is drawn about sprocket gear 42, which emulates a capstan for drive sprocket 44. In this embodiment, a second rear wheel type of drive sprocket 44 is used to transfer the linear force of the drive chain 32, to the front wheel hub 45 (not shown), as an angular force. As drive chain 32 is brought around to a forward portion of drive gear 42, it is concatenated to elastomeric cord 50 (or a similar resilient, or reflexing reset device). Thereafter, the cord 50 is tethered to anchor point 34 on the forwardmost portion of the bicycle frame 16. As the reader will readily discern, actuation of the lever 24 in an upward (rowing) moment will cause the chain to be pulled, in the direction shown by the dark arrows, and place an angular force (torque) on the drive sprocket 44 to impel the wheel 15 in the direction shown by the arcuate dark arrow; and, thereafter, as the lever is returned to the lever seat 27', the elastomeric cord 50, or other suitable resilient reset mechanism, retracts the chain 32 in the direction opposite the arcuate dark arrow, because this retrograde motion of the gear (capstan) 42 is readily allowed by the conventional bicycle drive sprocket utilized herein.

The foregoing description, with reference to FIG. 1, exemplifies my first embodiment of the present invention. A principal thrust of my invention is to provide both a means of exercise and a unique way of delivering repeatable impulses of torque to a steering wheel of a land vehicle, most of the down-stem apparatus can be of any type that generally converts the relatively linear output of the compound steering-and-rowing lever of my invention into an angular torque for repeated, impulsive application to the steering wheel, while accommodating a re-biasing, retarding or retrograde action of the force/torque conversion and application means to a home or neutral position. In some instances, those of ordinary skill will recognize that even the torque converter or clutch biasing (or rebiasing) subprocess may not be (fully) required as, for example, in the bicycle drive sprocket which I used in my original (and now, alternate) embodiment. As anyone familiar with bicycles will acknowledge, in order for a rear drive sprocket of a bicycle to acquire the facility of intermittent pedaling action, the drive sprocket assembly must entertain a "dwell" or "neutral" state, during which the rider does not pedal and the moving bicycle merely coasts, devoid of any propulsive torque. Thus, I now again define "biasing" to further encompass this neutral or uncoupled state, as well as a state of (re)initialization.

Referring to FIG. 2, there is exemplified in plan view the compound steering-and-rowing lever assembly as I prefer to embody it. The central portion of the handle bar 20 is illustrated at the right hand side and depending to the left are parallel bars 24, which give the handle bar assembly a castellated shape. The parallel bars 24 also comprise the turrets of the castellated assembly and terminate each in a concentric hinge which, with the steering arm 28, form the fulcrum of the second class lever system which is compounded with the steering apparatus. The steering arm is rigidly fixed to the stem 17 which passes through the lever seat 27-stop 27'; and, disposed between, and connected to, the lever arms 24 is parallel bar 29 (also referred to as cross tube 29). For actuation of the lever, the handle bar 20 is raised abruptly and parallel bars 24 are raised off the lever seat 27'. The mechanism shown at the extreme right is repeated below in FIG. 3, a side elevation, taken partially in section, which gives a clearer view of the unlocking mechanism that will allow the rider to raise the compound steering-and-rowing lever assembly of the invention. Thus, in FIGS. 2 and 3, the function of the illustrated parts becomes readily apparent: when the lever arms 24 are raised, the T bar 60 mechanism enclosed within the right hand lever arm moves therewith. When the handle grip 22 (not shown) is rotated in the arcuate direction shown in FIG. 3, unlocking shaft 70 moves therewith and retracts cable 72 in the direction shown. The retraction of cable 72 withdraws locking pin 74 from a forward notch or groove in steering arm 28, thus releasing lever arms 24 and handle bar assembly 20, 22 from the lever stop 27'. As soon as the rider's grasp on the handle grips is relaxed, biasing spring 76, located in cross tube 29, returns locking pin 74 to its "home" position of re-engaging the lever assembly with the steering stem or arm. During the aforesaid power stroke, a cable or cord is attached to a T bar 60 located in lever arm 24 (right side). As those of ordinary skill may readily surmise, this mechanism can be placed on the left side as well as the right or, for that matter, on both sides.

Figure 5:
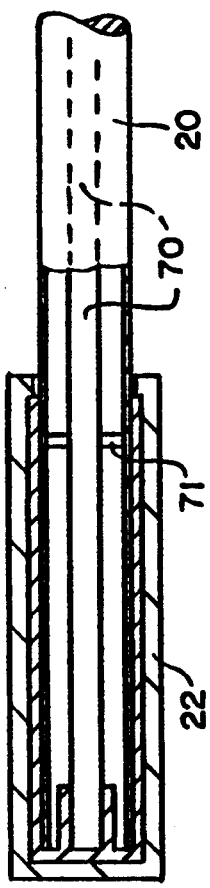
FIG. 5 is a partial front elevational cut-away view of a hand grip extension of a handle bar lock disengagement assembly.
Figure 4:
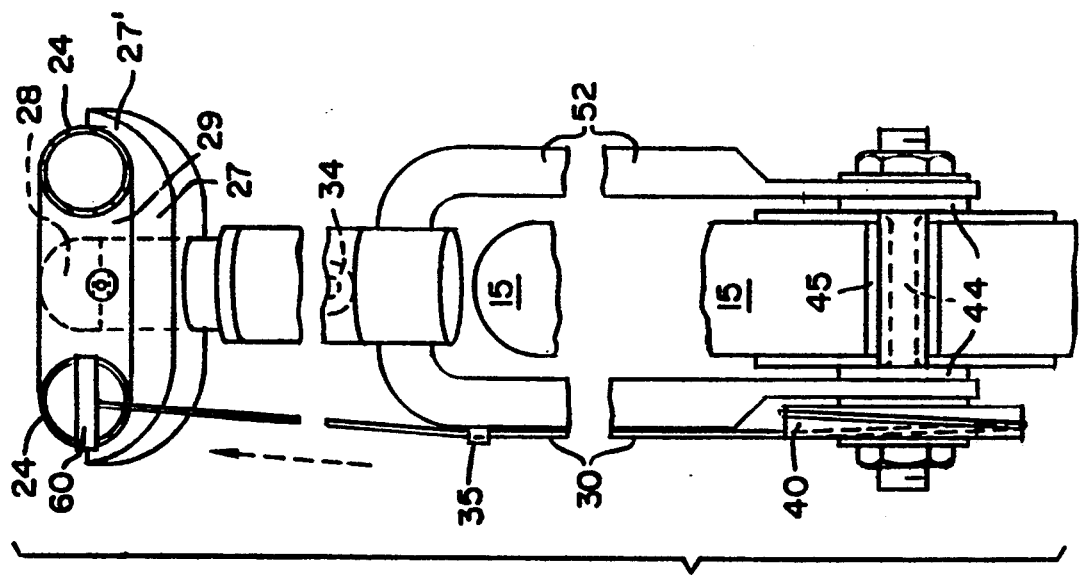
FIG. 4 is a partial front elevational view, taken in section, of a first embodiment of the present invention.

FIG. 4 illustrates the essential down-stem equipment of power transfer nature. This equipment is used for coupling an output from the (actuated) rowing lever and delivering the output to the axle or spindle of the steering wheel so that the wheel will rotate responsive to the operator's rowing movement or exercise of the compound steering assembly-lever 20–29. As seen in FIG. 4, a cable 30 depends downwardly from T bar 60, in lever arm 24, through guy 35, about a capstan 40 which is spring-biased (in one embodiment), to return thence to an initial or relaxed state. The capstan serves as a clutch drum for a standard inertial, ratchet or friction clutch which is then used to transfer power to the steering wheel hub 45. In lieu of the standard clutch, the capstan serves as the drum of a ratchet driver such as that employed in the earlier described recoil lawn mower starter. I consider my recoil starter-power transfer means to be my preferred embodiment in that it combines force/torque conversion means (the capstan) with a clutch means and recoil biasing. Should one prefer to use my original embodiment, however, the earlier described chain 32 mechanism is employed with the conventional driving sprocket 44 for transferring torque to the wheel hub 45. The other parts of FIG. 4 having been previously discussed, the reader's attention is now drawn to FIG. 5, a partial front elevational cutaway view of the hand grip extension of a handle bar, including the lock disengagement assembly. The handle bar 20 is disclosed with the conventional rotatable hand grip 22 coupled to unlocking shaft 70, which is positioned inside of the handle bar 20 by bushings 71. Thus, the reader may consider FIGS. 2 and 5 in combination, along with the added disclosure of FIG. 3, and readily grasp the functioning of the mechanisms depicted therein.

Figure 6:
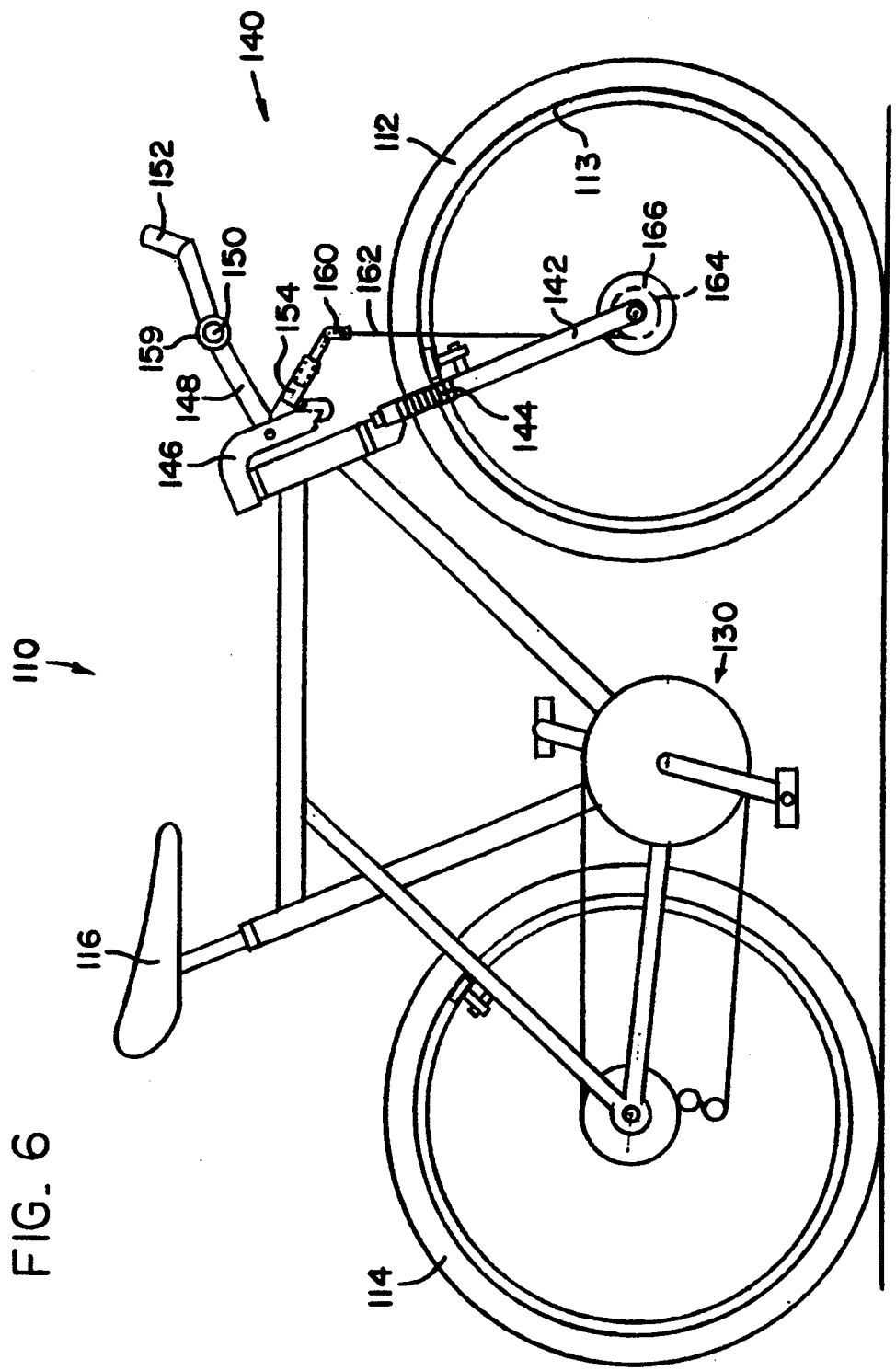
FIG. 6 is a side view of a bicycle containing the second embodiment of the present invention.
Figure 7:
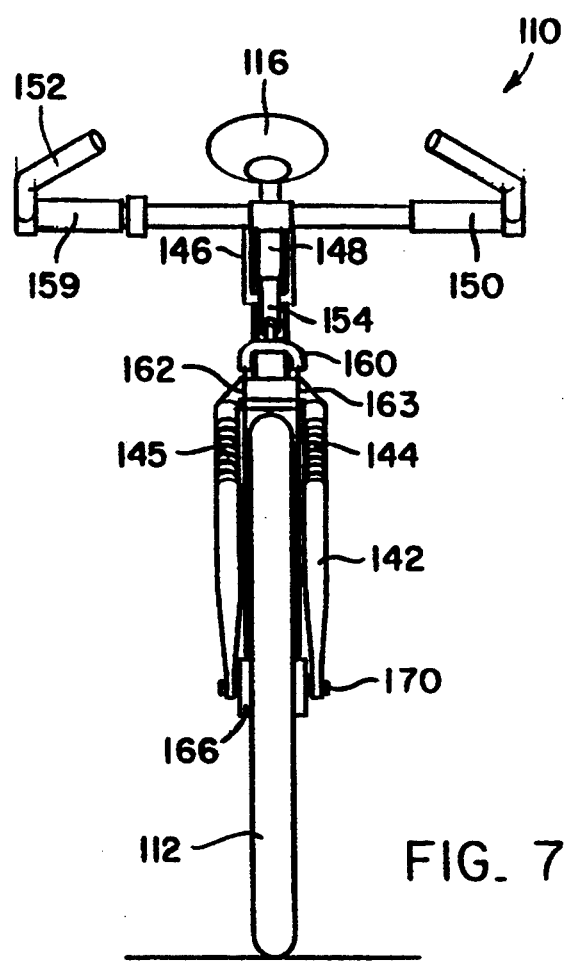
FIG. 7 is a front view of a bicycle containing the second embodiment of the present invention.

FIGS. 6 and 7 show a side view and front view of the second embodiment of the present invention, respectively. The second embodiment includes a front wheel drive mechanism 140 attached to a bicycle 110. The bicycle 110 includes rear 114 and front 112 wheels or tires mounted on rim 113. The bicycle 110 has a rear chain drive mechanism 130 for propulsion of the rear wheel 114.

The front wheel drive mechanism 140 provides forward propulsion of the bicycle by two different means—1) by an impulse or rowing mechanism and 2) by a shock driver mechanism. The mechanical hardware for these propulsion devices overlap and interrelate, however they may be independent. The forward end of the bicycle 110 includes a yoke or fork 142 having a shock absorber 144 with a shock absorber recoil mechanism 145 thereon. The recoil mechanism 145 may be either a compression spring or a pneumatic chamber, wherein compressed air absorbs the shock. The fork 142 144 is attached to the bike frame by a head tube 127. A rowlock stem 146 is pivotally attached to an upper portion of the head tube 127 about an axis concentric with the head tube 127.

A handle bar/driver mechanism 151 (FIGS. 8 and 9) is pivotally attached to the rowlock stem 146 about an axle 180. The handle bar/driver mechanism 151 includes a row stem 148, upright handle bars 150, pull handle bars 152, and an adjustable lever/torque arm 154. Affixed to the adjustable lever/torque arm is a release lever 158.

The release lever 158 engages with a catch 156 on the rowlock stem 146. The release lever is disengaged by a twist grip 159 which is mounted about the upright handle bars 150. The cable fork 160 is attached to one end of a dual drive cable which includes cables 162, 163. The cable 162 is attached at the end adjacent the front tire 112 to cable spool 164 of drive spring mechanism 166. The drive spring mechanism 166 is mounted to axle 170 on the front wheel 112 of the bicycle 110.

Figure 8:
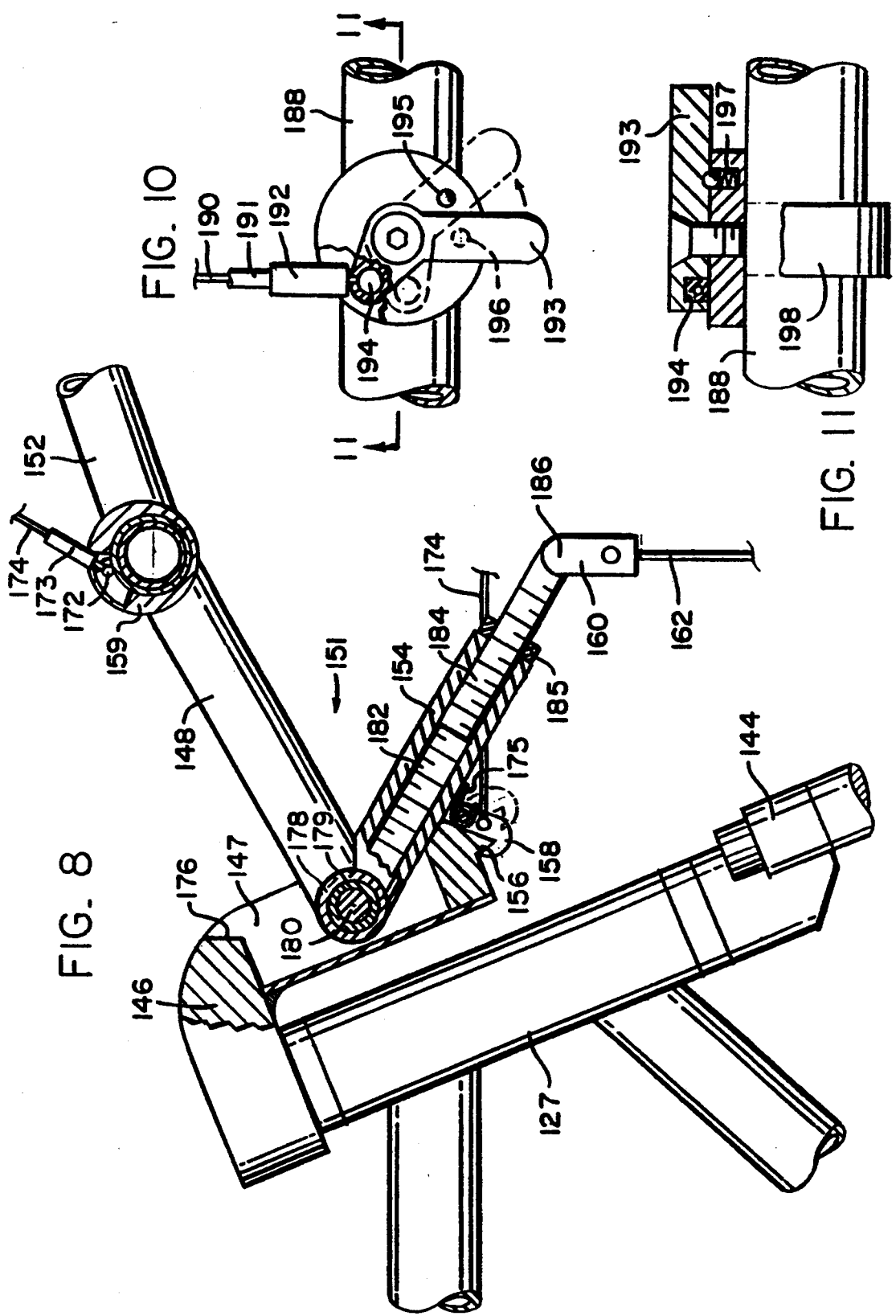
FIG. 8 is a cutaway side view of handle bar/driver assembly of the second embodiment of the present invention when used as a conventional bicycle.
Figure 9:
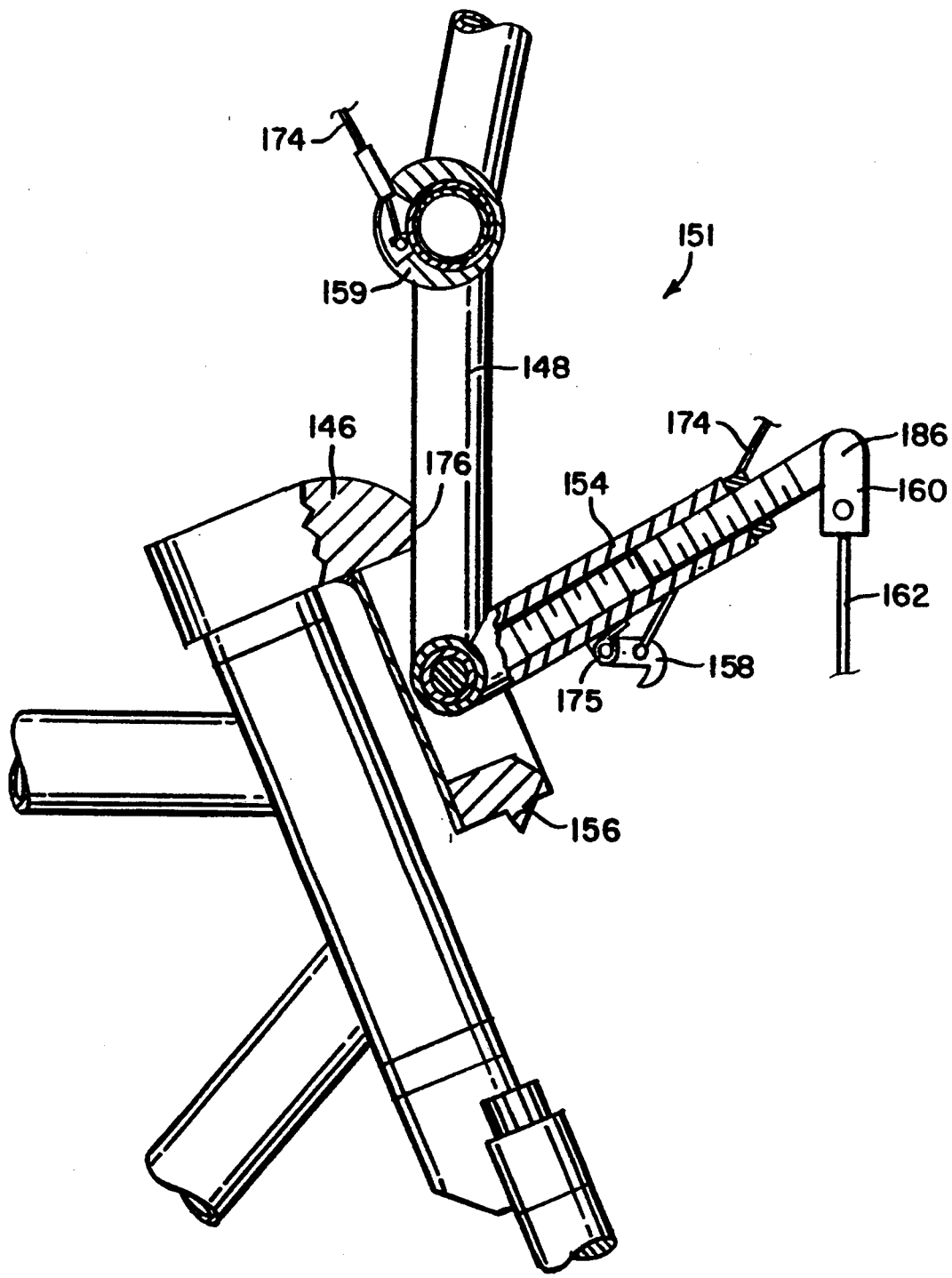
FIG. 9 is a cutaway side view of the handle bar/driver assembly of the second embodiment of the present invention when used as a drive mechanism for a bicycle.

FIGS. 8 and 9 disclose greater detail of the handle bar/driver mechanism 151 as pivotally mounted in the rowlock cavity 147 of the rowlock stem 146. The mechanism 151 is mounted in the rowlock cavity 147 by an axle 180. The axle 180 may be rigidly affixed by any conventional fasteners such as a quick release, nuts, or the like. Concentrically outward from the axle 180 is a bearing surface 179 which is press-fitted into row stem tube 178 at one end of the row stem 148. At a location distal the row stem tube 178 along the row stem 148 are the pull handle bars 152 and the upright handle bars 150. The upright handle bars 150 include a twist grip release 159 for rotating release lever 158 through a release lever cable 174. The release lever cable 174 is attached to the twist grip 159 by a barrel 172. Cable tensioner 173 may be used to adjust the tension in cable 174.

Rigidly affixed to and opposite the row stem 148 is an adjustable lever/torque arm 154. The release lever 158 is affixed to the arm 154 and biased by the release lever spring 175 such that the release lever 158 engages the catch 156 on the rowlock stem 146.

The inside of the adjustable lever/torque arm 154 includes an inner threaded surface 182 and an outer threaded surface on an extension arm 184. Although a threaded surface is shown, any type of telescoping or extension mechanism is contemplated as being within the spirit of the present invention. At a distal end of the extension arm 184 is mounted cable fork 160 at pivot 186.

FIGS. 10 and 11 illustrate an alternate actuating device for release lever 158. FIG. 10 shows a thumb release lever 193 mounted on upright handle bar 188. The thumb release lever actuates the release lever 158 through cable 190. The cable 190 includes a sheath 191. A cable tensioner 192 is provided to tighten the cable 190.

As shown in FIGS. 10 and 11, the cable 190 is attached to the thumb release 193 by a barrel 194. A ball detent 195 with a spring 197 and recess 196 hold the thumb release in place. The thumb release is affixed to the handle bar 188 by clamp 198.

Figure 12:
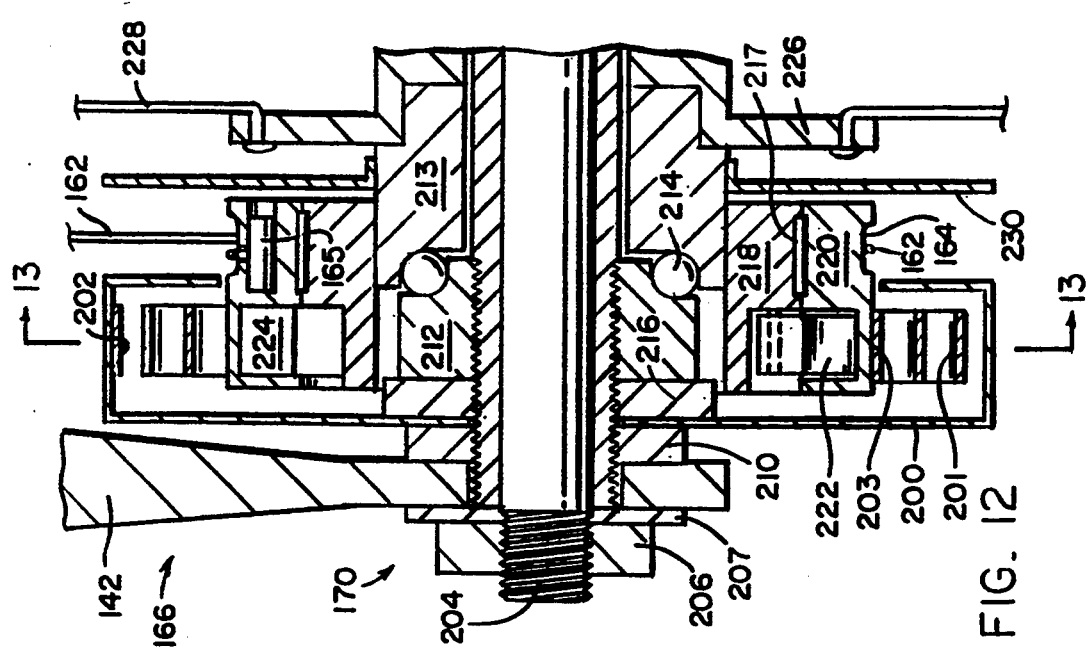
FIG. 12 is a sectional view of the impulse drive mechanism of the second embodiment of the present invention.
Figure 13:
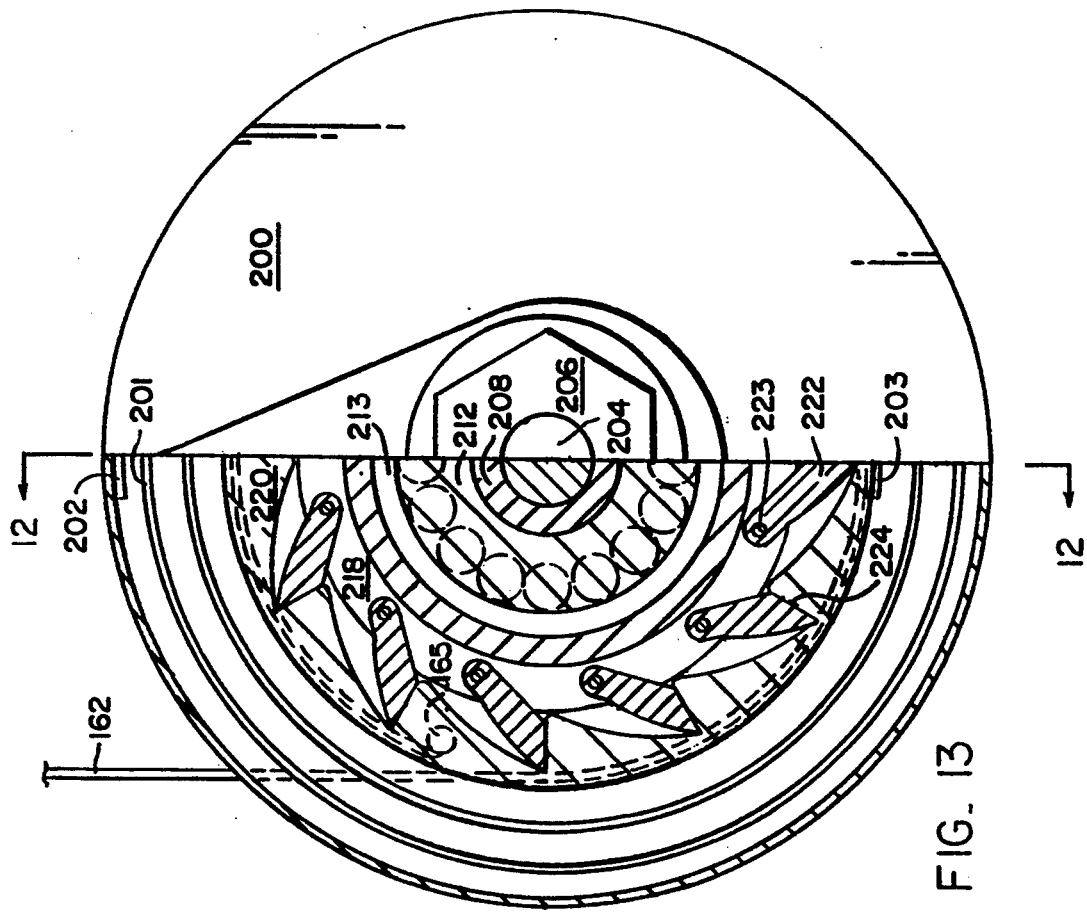
FIG. 13 is an elevational view of the impulse drive mechanism of the second embodiment of the present invention.

FIG. 12 is a sectional view of the impulse drive mechanism and FIG. 13 is a cutaway elevational view of the impulse drive mechanism 166 as taken through lines 13—13 of FIG. 12. The impulse drive mechanism 166 includes three groups of mechanical parts which are fixed for relative rotation with one another—1) The first group is fixed for rotation with the tire and comprises pawl ring 218, pawls 222, pawl pivots 223, inner race 213, hub 226, cable guard 230, and spokes 228. The inner race 213 is rigidly affixed, such as by press fitting, or integral with the pawl ring 218. The cable guard 230 assists in preventing the cable 162 from derailing from the spool 164. 2) The second group is fixed in a nonrotational stationary position with the axle 170. This group includes the inner axle 204, outer axle 208, outer race 212, spacer or nut 216, impulse drive housing 200, spacer or nut 210, fork 142, washer 207, and tightening nut 206. Ball bearings 214 are placed between the first group and the second group. 3). The third rotational group includes tooth ring 220 having teeth 224 thereon, reset spring 201, cable 162, and cable barrel 165. The tooth ring 220 includes a spool surface 164 for winding of the cable 162. The reset spring 201 is attached to the tooth ring 220 at attachment point 203 and to the impulse spring housing 200 at attachment point 202. The attachment points 202 and 203 are formed by any conventional method such as welding, soldering, brazing, screw, etc. The third rotational group has its rotation controlled by a pre-loaded reset spring 201 and a tensioned cable 162. As the tension on cable 162 is slackened, pre-loaded reset spring 201 advances tooth ring 220 past pawl ring 218. When the tooth ring 220 advances past the pawl ring 218, it may be either stationary or rotating with the tire. A bearing surface 217 provides relative rotational movement between the tooth wheel 220 and the pawl ring 218.

Having described the various features on the second embodiment of the present invention, the operation of these features will be described in greater detail.

Release Mechanism

Two release mechanisms are illustrated in FIGS. 8-11. The first release mechanism is actuated by a twist grip 159. As shown in FIG. 8, twist grip 159 is rotated counterclockwise resulting in the tensioning of release lever cable 174. The tensioning of release lever cable 174 overcomes the spring force of the release lever spring 175 thus unlatching the release lever 158 from the catch 156. The handle bar mechanism 151 may then be rotated in a counterclockwise (as shown in FIG. 9) until the row stem 148 encounters the row stem abutment surface 176.

The second release mechanism shown in FIGS. 10 and 11 is actuated by a thumb release lever 193 mounted on handle bar 188. As shown in FIG. 10, the thumb release lever 193 is rotated to the phantom position to tension cable 190. The tensioning of cable 190 results in release of release lever 158 by overcoming the spring force of the release lever spring 175. Since the spring force tends to pull the cable 190 to a slack position, a ball 195 and spring 197 are provided for engagement with a detent 196 to hold the catch in an open position (see e.g., FIG. 9). When it is desired to place the handle bars in a locked position, the thumb release 193 is rotated in the opposite direction.

Handle Bar/Driver Mechanism with Variable Torque Arm

The handle bar driver mechanism 151 comprises a plurality of lever arms or the row stem 148 and the adjustable lever/torque arm 154 for providing a pull force to the drive cables 162, 163. Although lever arms 148, 154 are shown, other devices may be used which can apply a quick or impulsive tensioning force to the drive cables 162, 163. The advantage of the handle bar driver mechanism 151 of the present invention is that the driver can maintain stability while still providing the impulse force to the drive cables 162, 163.

The resultant force applied to the drive cables 162, 163 can be varied through the adjustable torque arm 154. As the threaded arm 184 is extended, the resultant force applied to the drive cables 162, 163 is decreased.

Impulse Drive Mechanism as an Impulse Driver

Referring to FIGS. 12 and 13, the impulse drive mechanism 166 is placed on the axles 204, 208 and pre-tensioned by rotating the impulse drive housing 200 (as shown in FIG. 13) counterclockwise. The housing 200 is then locked into place by tightening nut 210.

The impulse drive mechanism 166 is actuated as a driver when the drive cable 162 is pulled or tensioned upwardly by the handle bar/driver mechanism 151. The tooth wheel 220 moves clockwise as the drive cable 162 is pulled or tensioned. A clockwise rotation of the tooth wheel 220 engages the pawls 222 which rotate the pawl wheel 218 clockwise. Since the pawl wheel 218 is rigidly affixed or integral with the hub 226 the tire rotates.

On the downward stroke of the handle bar driver mechanism 151, the cable 162 is slackened. As the cable 162 is slackened, the tooth wheel 220 ratchets past the pawl wheel 218 in a counterclockwise direction due to the unwinding of the reset spring 201.

Impulse Drive Mechanism as a Shock Driver

Figure 14:
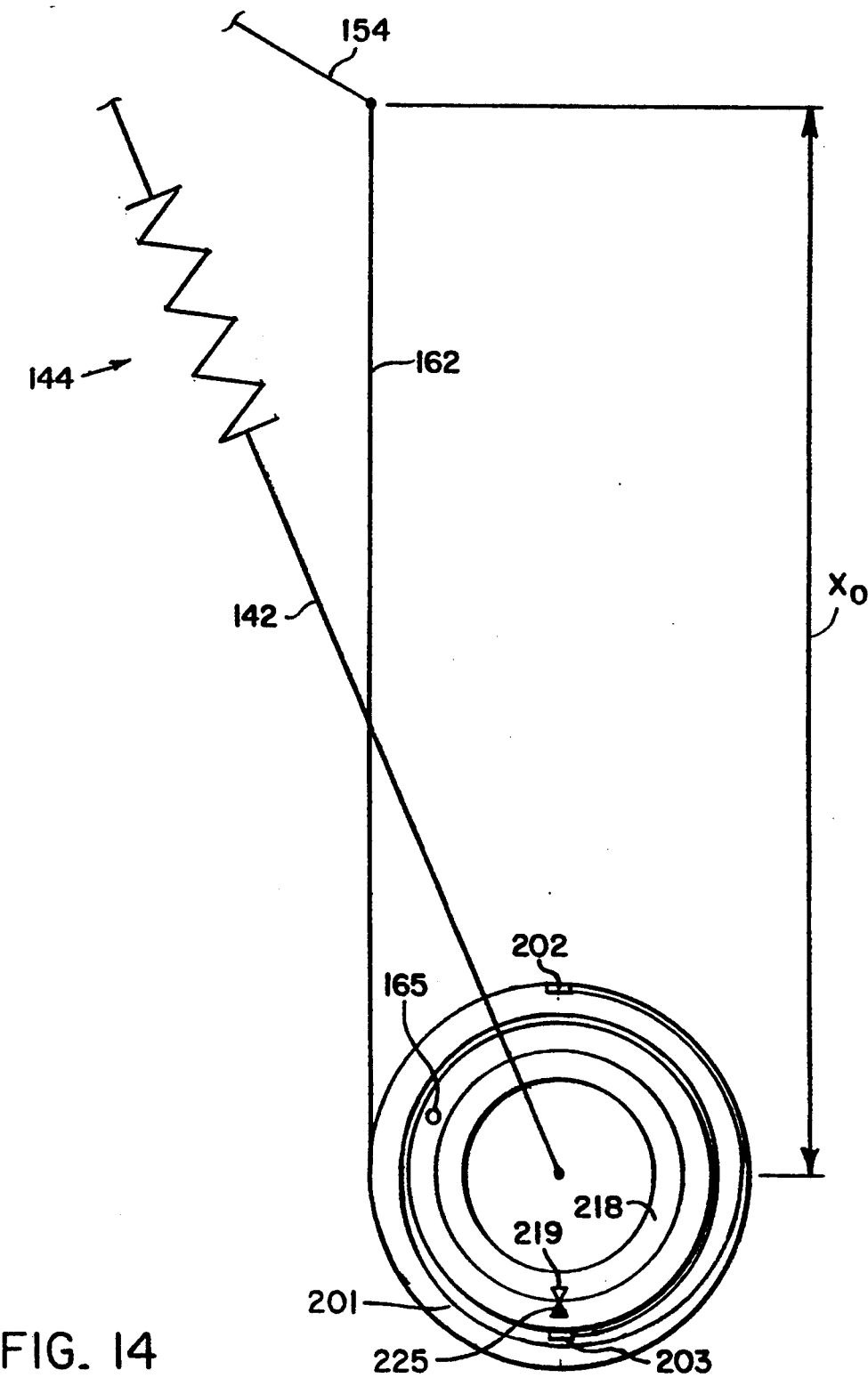
FIG. 14 is a force diagram of the second embodiment of the present invention illustrating the shock driver mechanism in a neutral position.
Figure 15:
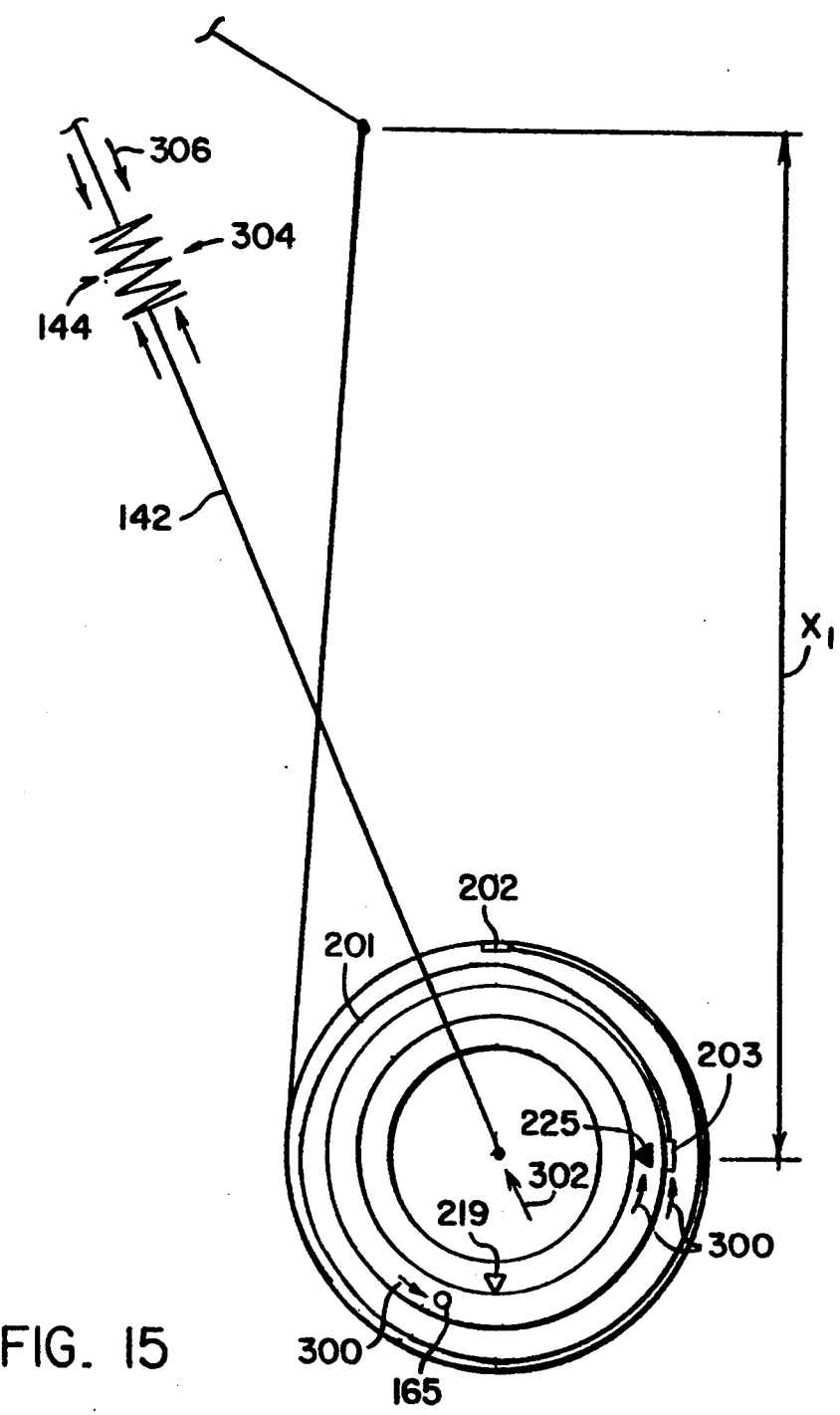
FIG. 15 is a force diagram of the second embodiment of the present invention illustrating the shock driver mechanism in a compressed position.
Figure 16:
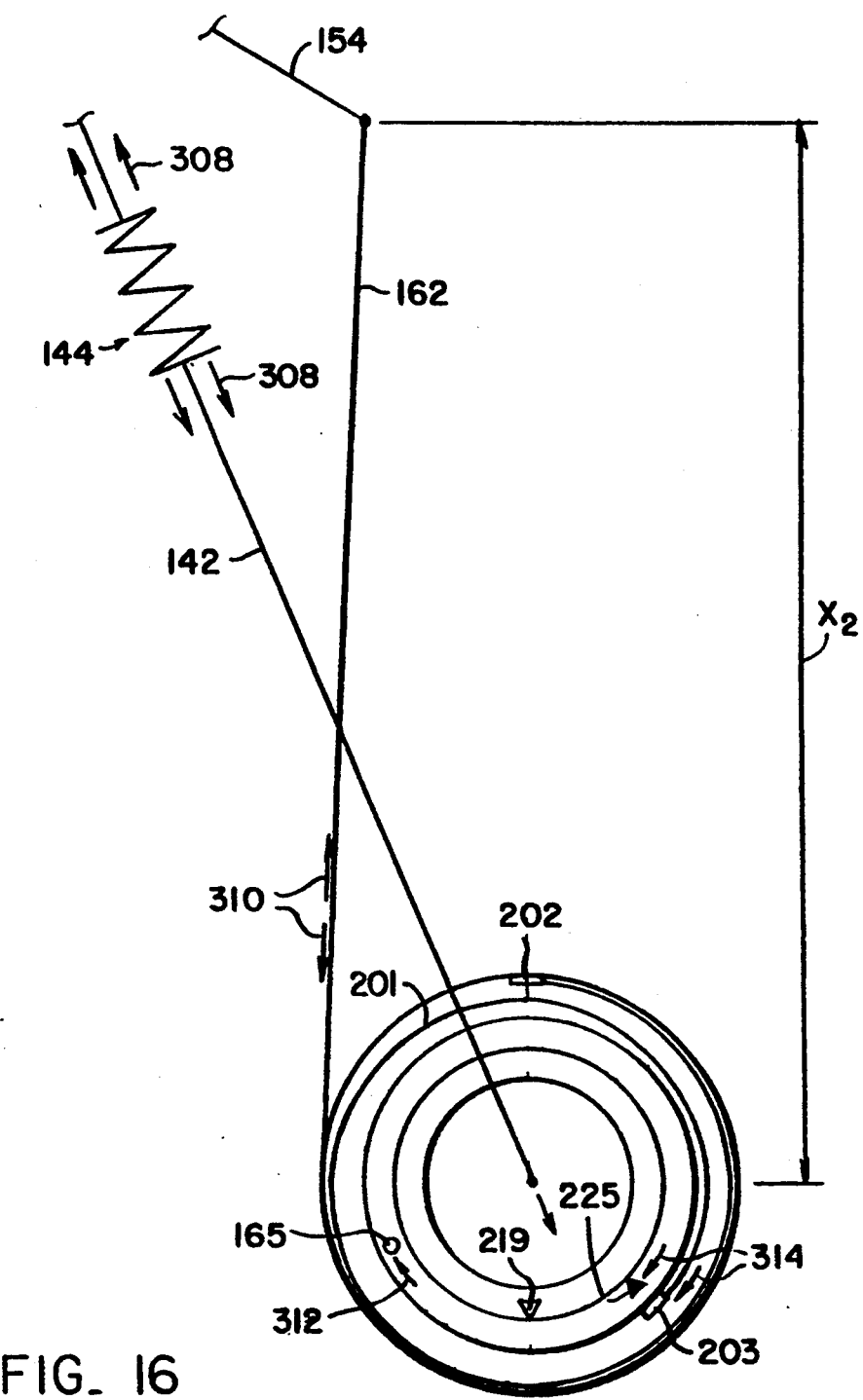
FIG. 16 is a force diagram of the second embodiment of the present invention illustrating the shock driver mechanism in a recoil position.

FIGS. 14–16 illustrate the shock driver principle of the second embodiment of the present invention. FIG. 14 shows the shock absorber 144 in a neutral position. The attachment point 202 of the reset spring 201 to the impulse drive housing 200 is rotationally fixed. The drive cable barrel 165 and the attachment point 203 of the reset spring 201 to the tooth wheel 218 are fixed with respect to one another, but variable with respect to attachment 202. A reference point on the tooth wheel 218 is shown at 225 and a reference on the pawl ring 218 is shown at 219. The distance between the torque arm 154 and the center of the impulse drive housing 200 is $x_0$.

FIG. 15 illustrates compression 304 of the recoil mechanism on the shock absorber 144 due to the weight 306 of the vehicle and rider as well as the upward force 302 of the tire encountering an obstacle such as a curb or bump. As the recoil mechanism 145 on the shock absorber 144 compresses, the drive cable 162 is slackened and the distance $x_0$ shortens to $x_1$. The slackening of the cable 162 results in the spring force 300 unwinding the reset spring 201. This advancement creates a relative advanced positioning of the tooth ring reference point 225 with respect to the pawl ring reference point 219.

FIG. 16 illustrates the spring recoil 308. As the shock absorber 144 recoils, the cable 162 is tensioned at 310 resulting in a pull on the cable barrel 165, the spring attachment point 203, and the tooth wheel reference point 225 rotate in a clockwise direction 314. During this rotation, the tooth wheel 220 engages the pawl ring 218 and the vehicle advances the vehicle forward. As the cable 162 pulls the tooth wheel reference 225 clockwise, the distance $x_1$ is extended to the distance $x_2$.

The amount of recoil spring force 308 the shock absorber 144 has may be varied to compensate for variations in weight of the rider. Heavier riders will need a greater recoil force 308 to overcome the weight of the bicycle and rider 306 and the frictional force of the wheel. The recoil force of the shock absorber 144 when a compression spring is used may be varied by a screw or other adjustment mechanism which extends through the shock absorber recoil mechanism 145. The recoil force of a pneumatic shock absorber 144 may be varied by variations in port size through which hydraulic fluid passes. In a pneumatic shock absorber, hydraulic fluid is used to push a piston head which compresses air. The piston head is recoiled by the compressed air returning to a lower pressure state. This recoil of the piston head is controlled by the port size through which hydraulic fluid may pass. Such system is known to one of ordinary skill in the shock absorber art.

The embodiments disclosed herein have been discussed for the purpose of familiarizing the reader with the novel aspects of the invention. Although preferred embodiments of the invention have been shown, many changes, modifications and substitutions may be made by one having ordinary skill in the art without necessarily departing from the spirit and scope of the invention as described in the following claims.

What is claimed is:

1. A land vehicle comprising:
  a frame, including a seat, a rear wheel, a front wheel, a front wheel fork, a front steering stem and a handle bar assembly;
  a shock absorber attached to said fork;
  an impulse drive mechanism, including a reset spring and a clutch, operatively connected to said front wheel for propulsion of said front wheel; and
  a cable means having a first end attached to said impulse drive mechanism and a second end attached to said land vehicle at a point distal from said impulse drive mechanism, whereby upon compression of said shock absorber, said cable means is slackened and said impulse drive mechanism rotates in a first direction of rotation and upon expansion of said shock absorber, said cable means is tensioned and said impulse drive mechanism rotates in a second direction of rotation such that said front wheel is propelled.

2. The land vehicle of claim 1, wherein said land vehicle is a bicycle.

3. The land vehicle of claim 1, wherein said cable means is attached to said handle bar assembly and wherein said handle bar assembly reciprocates about an axis of rotation.

4. The land vehicle of claim 3, wherein said handle bar assembly has a release lever pivotally attached thereto and said front steering stem has a catch.

5. The land vehicle of claim 4, wherein said release lever is released by a twist grip.

6. The land vehicle of claim 4, wherein said release lever is released by a thumb release lever.

7. The land vehicle of claim 1, wherein said impulse driver mechanism comprises:
  a reset spring;
  a pawl wheel; and
  a tooth wheel.

8. The land vehicle of claim 1, wherein the shock absorber includes a compression spring.

9. A front wheel drive mechanism for a land vehicle having a frame, including a seat, a rear wheel, a front wheel, a front wheel fork, a front steering stem, and a handle bar assembly, said front wheel drive mechanism comprising:
  a shock absorber attached to said fork whereby upon compression and extension of said shock absorber the distance between the axle of said front wheel and said frame decreases and increases respectively;
  a spring-biased clutch attached for movement with said axle;
  an elongate member having a first end engaging said clutch and a second end fixed to said land vehicle at a point distal from said clutch, whereby upon compression of said shock absorber said spring-biased clutch recoils and upon extension of said shock absorber said clutch is rewound and said front wheel is propelled in the direction of travel.

10. The front wheel drive mechanism of claim 9, wherein the land vehicle is a bicycle.

11. The front wheel drive mechanism of claim 9, wherein the second end of the elongate member is attached to said handle bar assembly.

12. The front wheel drive mechanism of claim 9, wherein the shock absorber includes a compression spring.

* * * * *